US009619779B2

(12) United States Patent
Fosback et al.

(10) Patent No.: US 9,619,779 B2
(45) Date of Patent: Apr. 11, 2017

(54) CLIENT-SIDE POLICY ENFORCEMENT OF DEVELOPER API USE

(75) Inventors: Jason Robert Fosback, Seattle, WA (US); Ricardo D. Cortes, Los Gatos, CA (US); David Makower, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/219,551

(22) Filed: Aug. 26, 2011

(65) Prior Publication Data

US 2013/0055211 A1 Feb. 28, 2013

(51) Int. Cl.
*G06F 9/44* (2006.01)
*G06Q 10/10* (2012.01)
*G06Q 10/06* (2012.01)

(52) U.S. Cl.
CPC .............. *G06Q 10/10* (2013.01); *G06F 8/75* (2013.01); *G06Q 10/06* (2013.01)

(58) Field of Classification Search
None
See application file for complete search history.

(56) References Cited

U.S. PATENT DOCUMENTS

| 6,486,439 | B1 * | 11/2002 | Spear et al. ................... 219/136 |
| 6,714,915 | B1 * | 3/2004 | Barnard et al. .............. 705/7.13 |
| 6,952,497 | B1 * | 10/2005 | Hollstrom et al. ........... 382/188 |
| 7,069,474 | B2 * | 6/2006 | Atallah ..................... G06F 8/60 |
| | | | 714/38.14 |
| 7,150,008 | B2 | 12/2006 | Cwalina et al. |
| 7,191,435 | B2 | 3/2007 | Lau et al. |
| 7,555,749 | B2 * | 6/2009 | Wickham et al. ............ 717/168 |
| 7,885,896 | B2 * | 2/2011 | Lenard et al. .................. 705/59 |
| 8,219,854 | B2 * | 7/2012 | Busayarat ........... G06F 11/3664 |
| | | | 714/25 |
| 8,286,233 | B1 * | 10/2012 | Boland et al. .................. 726/17 |
| 8,296,758 | B2 * | 10/2012 | Kabadiyski ................... 717/174 |
| 8,442,871 | B2 * | 5/2013 | Veres et al. .................. 705/26.3 |
| 8,468,090 | B2 * | 6/2013 | Lesandro et al. ............... 705/39 |
| 8,533,799 | B2 * | 9/2013 | Ye ....................... H04L 41/5054 |
| | | | 709/238 |
| 8,776,047 | B2 * | 7/2014 | Wookey ........................ 717/175 |
| 2002/0087949 | A1 * | 7/2002 | Golender et al. ............. 717/124 |

(Continued)

OTHER PUBLICATIONS

Joshua Matthew Williams, et al., U.S. Appl. No. 12/785,365, filed May 21, 2010, entitled "Automated Qualification of a Binary Application Program," 40 pages.

*Primary Examiner* — Evral E Bodden
(74) *Attorney, Agent, or Firm* — Polsinelli LLP

(57) ABSTRACT

Methods and systems are disclosed that allow automated pre-qualification and qualification of an application. An application description can be generated for an application submitted by a developer, the application description can be automatically examined to determine whether the application complies with rules or guidelines (e.g., policies) of a platform. If the application complies with the rules or guidelines, the application can be pre-qualified and submitted for approval and distribution. If the application does not comply with the rules or guidelines, the application developer can be notified of the errors in the application and the developer can be prevented from uploading the application for approval and distribution.

34 Claims, 11 Drawing Sheets

(56) References Cited

U.S. PATENT DOCUMENTS

| | | |
|---|---|---|
| 2003/0226134 A1* | 12/2003 | Sethi .................. G06F 11/0769 717/147 |
| 2004/0006610 A1* | 1/2004 | Anagol-Subbarao .. G06Q 10/06 709/222 |
| 2004/0243260 A1* | 12/2004 | Law et al. ....................... 700/86 |
| 2005/0066019 A1* | 3/2005 | Egan et al. ................... 709/223 |
| 2006/0072456 A1* | 4/2006 | Chari et al. ................... 370/230 |
| 2006/0282897 A1 | 12/2006 | Sima et al. |
| 2007/0078914 A1 | 4/2007 | Correl et al. |
| 2007/0168917 A1* | 7/2007 | Janson .......................... 717/101 |
| 2007/0174817 A1 | 7/2007 | Fanning et al. |
| 2007/0192453 A1* | 8/2007 | Copeland ................ H04L 12/66 709/223 |
| 2007/0240223 A1 | 10/2007 | Zpevak et al. |
| 2008/0134155 A1* | 6/2008 | Miller .......................... 717/139 |
| 2008/0134156 A1 | 6/2008 | Osminer et al. |
| 2008/0208964 A1* | 8/2008 | Belyaev ....................... 709/203 |
| 2008/0276102 A1* | 11/2008 | MacKay ................. G06F 21/10 713/193 |
| 2010/0011209 A1 | 1/2010 | Kiriansky et al. |
| 2010/0011415 A1 | 1/2010 | Cortes et al. |
| 2010/0088367 A1 | 4/2010 | Brown et al. |
| 2011/0058516 A1 | 3/2011 | Small et al. |
| 2011/0252415 A1* | 10/2011 | Ricci ...................... G06Q 10/06 717/173 |
| 2011/0289483 A1 | 11/2011 | Williams et al. |
| 2013/0173634 A1* | 7/2013 | Shaban Hussein ........... 707/748 |
| 2014/0075520 A1* | 3/2014 | Subramanian ........ H04L 63/101 726/4 |
| 2015/0113515 A1* | 4/2015 | Lachambre ............... G06F 8/70 717/168 |

\* cited by examiner

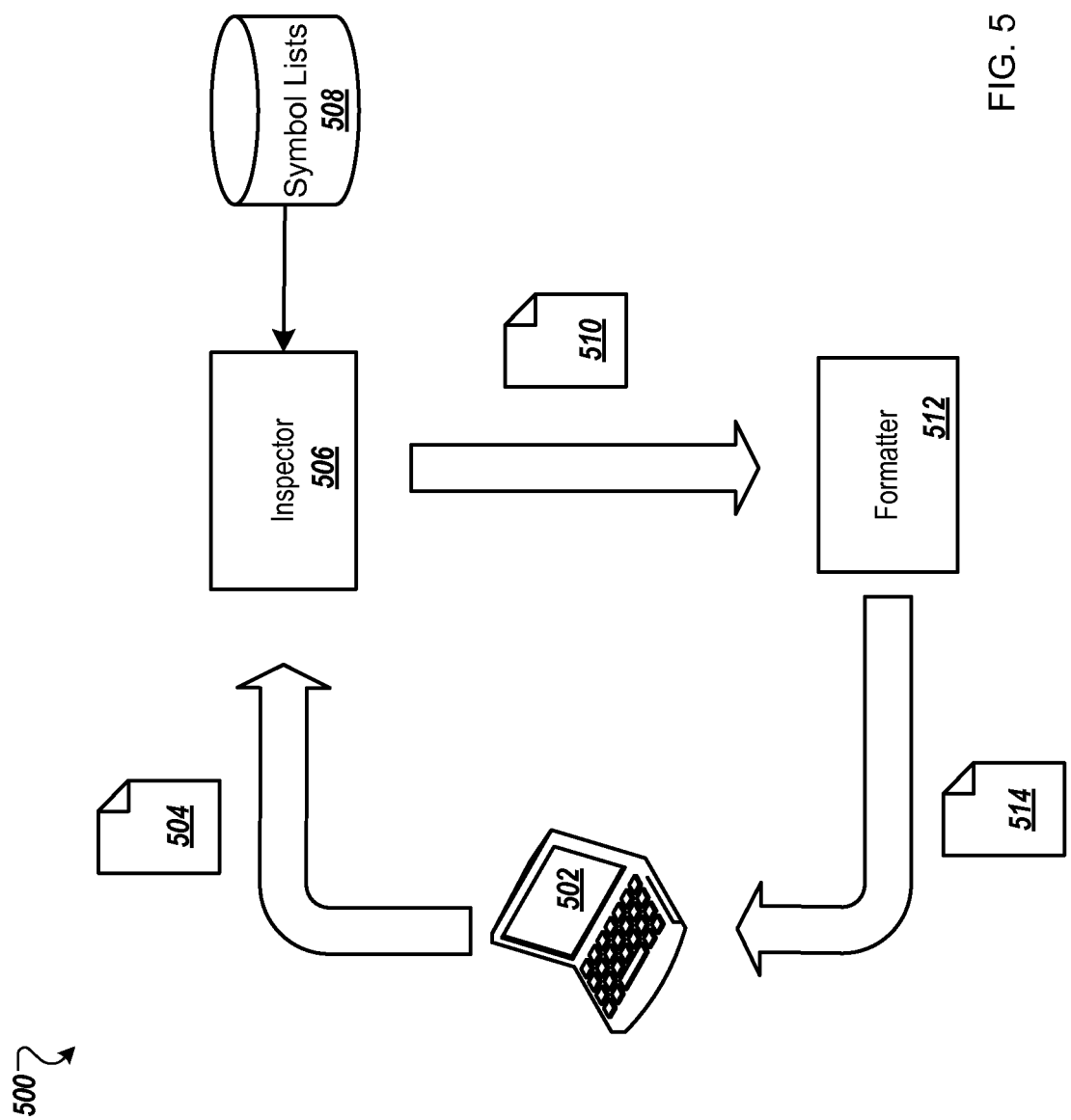

Pre-qualification Result for Your App

Errors

Libraries
abc.lib

Functions

602

Explanation

Library abc is a library of system program interface (SPI), to which you have no access under your current license. Your submission will be rejected. Consider using another library.

604

Warnings

Classes
xyz

Selectors
+ foo
- bar

606

Class selector foo and instance selector bar are deprecated. It is possible that your submission will be rejected. Consider using another selector.

608

600

FIG. 6 ical field

This subject matter is generally related to software development.

BACKGROUND

A software development process can include a structure for creating and maintaining a software product. A software development process can include multiple stages. Some example software development stages can include design, implementation, testing, and distribution. Some models of software development processes in existence today include waterfall model, spiral model, agile software development, extreme programming (XP), among others.

Modern software development processes for various data processing systems allow for participation of a vast number of diverse developers for a platform (e.g., a mobile device development platform). Tools for developing software for the platform can include a publicly available software development kit (SDK) and various rules and guidelines. The SDK can include various libraries and an integrated development environment (IDE). Using the SDK, a developer can develop an application program for the platform. The application program can be distributed to data processing systems that are compatible with the platform, for example, through an application store.

SUMMARY

Methods and systems are disclosed that allow for client-side policy enforcement of developer application programming interface (API) use. In some implementations, a developer can generate an application description for an application and submit the application description to a server for pre-qualification (e.g., API, configuration and/or resource validation). If the server determines that the application can be pre-qualified based on the application description, the client can upload the application for approval and distribution. If the server determines that the application cannot be pre-qualified based on application description, the server can send the client a message indicating errors in the pre-qualification process and prevent the client from uploading the application for approval and distribution.

In some implementations, a server can receive an application description for an application, or portion of an application, from a client device and pre-qualify the application based on the application description. Pre-qualification can include validating developer API usage based on the application description. The server can determine which APIs are described in the application description, compare the APIs to API usage policies (e.g., blacklists, whitelists, developer licenses, etc.), generate warnings and errors based on the comparison. Pre-qualification can include validating application metadata (e.g., configuration and/or resources). The server can compare the metadata to policies that describe allowed and disallowed configurations and resources and generate warnings and errors based on the comparison. The developer can be prevented from uploading the application for approval and distribution when errors are generated. The developer can be allowed to upload the application for approval and distribution when no errors are generated.

Particular embodiments of the subject matter described in this specification can be implemented to realize one or more of the following advantages. Using the automated pre-qualification process, a developer can quickly determine whether the developer's application complies with application approval policies without having to wait for a full application qualification and approval process to be completed. Pre-qualification can be based on the application description alone, without requiring an inspection of the source code of the application program. Thus, a developer need not divulge the source code. If the application description describes system libraries that are beyond the scope of a publicly available SDK, the system can notify the application developer by presenting error and warning messages. Likewise, if the application description includes disallowed configuration data or resources, the application developer can be notified. The system implementing the automated pre-qualification process can detect possible use of deprecated libraries, classes, or functions, and notify the developer that the application program, although working now, may break in a future release of the platform. The developer can thus take cautionary measures (e.g., by using another functionally similar library, class, or function) to make the application program more robust before submitting the full application for final approval.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 5 illustrates components of an example sub-system for API validation prior to application upload.

FIG. 6 illustrates an example user interface for notifying a developer of errors and warnings identified based on an application description.

Like reference numbers and designations in the various drawings indicate like elements.

DETAILED DESCRIPTION

Example Software Development Process

Figure 1:
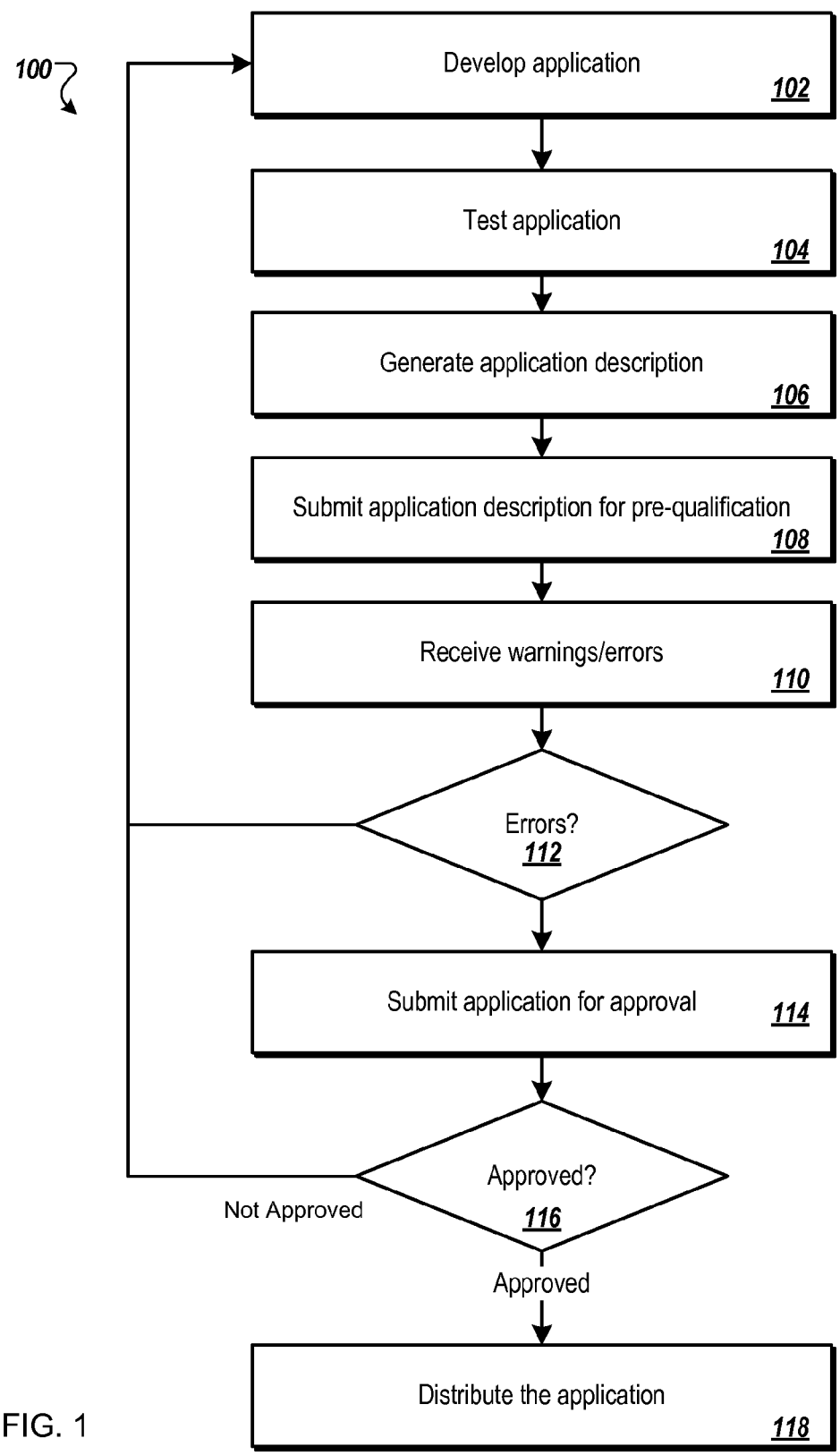
FIG. 1 is a flowchart illustrating example software qualification processes.

FIG. 1 is a flowchart illustrating an example software qualification process 100, including pre-qualification. In example process 100, a developer acquires (e.g., by downloading) an SDK of a platform (e.g., a mobile device development platform), and develops an application program. The application program is to be distributed (e.g., provided for download) to other users of mobile devices compatible with the platform.

The developer can develop (102) an application. In this specification, any person who engages in any part of developing the application can be a developer. Developing the application can include, for example, gathering requirements, designing the application, writing source code of the application, compiling the source code into binary code, and linking the binary code into executable code.

The application being developed in process 100 can include any computer instructions that are configured to perform user tasks (e.g., tasks that produce results for a user) or system tasks (e.g., tasks that manage computing resources of a computer) or both. The application can be an application based on a specified platform (e.g., the mobile devices development platform). The platform can include published SDK and libraries. Not all libraries of the platform need to be published. For example, based on various licensing agreements, some system libraries, some classes in a particular library, or some particular functions in a class may not be available to the general public or to a particular developer, depending on a license (e.g., a public license, a preferred license, etc.) held by the developer. Thus, the developer can be prohibited from accessing certain libraries, classes, or functions, even if the libraries, classes, and functions are declared "public" (instead of "private" or "protected") in an object-oriented programming environment. The developer can test (104) the application, for example, by executing and debugging the executable code.

Once the developer is satisfied with the testing, the developer can submit the application for pre-qualification. Pre-qualification can be performed prior to uploading the entire application to a server for full review and approval. Pre-qualification can provide the developer with feedback faster than if the developer had to wait for completion of the full application review and approval process. Pre-qualification can include API validation, configuration validation and/or application resource validation.

During prequalification, an application description can be generated for the application (106). For example, before uploading the entire application to the server, a software tool can be run on a directory containing the application, or a portion of the application (e.g., library, class, compiled code snippet, etc.), to generate an application description file (e.g., a zip file, archive file, tar file, etc.). The application description can be generated at a client device (e.g., the computer that the developer uses to develop the application). The application description can include executable binary files for the application (e.g., mach-o binary files, executable code, libraries, etc.). The application description can include metadata for the application. For example, application metadata can include application configuration information (e.g., info.plist file information, nib file information, mobile provisioning file information) and/or selected application resources (e.g., images, icons, etc.).

Once the application description is generated, the application description can be submitted to a server for pre-qualification (108). For example, the application description can be transmitted from the client device to a server over a network. The server can compare the application description to policy information to determine if the application description describes an application that complies with the policies specified in the policy information. Policy information (e.g., application development policies) can identify approved and/or prohibited APIs, configurations and/or resources for the platform. The policy information can include general policies applied to all developers and/or policies that are specific to a particular developer (e.g., based on a developer license).

During pre-qualification, the server can automatically determine whether the submitted application description describes libraries, classes, functions, configurations or resources that are prohibited for use by the submitting developer. Pre-qualification can also include automatically determining whether the application program uses deprecated libraries, classes, or functions, such that although the application program can execute properly at the time of the review, the libraries, classes, or functions are scheduled to be change or removed in the future, causing the application program to fail. The server can apply general policies and/or developer-specific policies that reflect licenses that the developer holds. The server can generate warnings and/or errors based on the comparison of the application description to the policy information.

In some implementations, the client can wait to receive results of the pre-qualification from the server. For example, the client application that uploaded the application description to the server may use a blocking or synchronous call when sending the application description to the server such that the client will wait to receive the results of the pre-qualification from the server before allowing the developer to upload the application to the server. Once the server has completed its analysis of the application description, the server can send the client a list of warnings and errors resulting from the pre-qualification process. If there are no warnings or errors, the server can send the client an indication that the application description has passed the pre-qualification process. The client can then upload the full application to the server for full review, approval and distribution.

The client can receive pre-qualification warnings and/or errors (110). If the client receives an error (112), the developer can be prevented from uploading the application for full review, approval and distribution. The application developer can continue developing (102) or revising the application to fix the errors and/or warnings.

If the client receives no errors (e.g., only warnings, no warnings and no errors), the developer can upload the application for full review, approval and distribution (114). Alternatively, the developer can skip uploading the application for full review and continue developing the application (102). For example, the developer can fix the problems that generated the warning messages and regenerate and resubmit the application description for pre-qualification. For example, the error and warning messages can be presented to the developer using the interfaces described with reference to FIG. 6. In some implementations, pre-qualification can ends at step 110. For example, the application may still be in development and the developer may not wish to upload the application after the pre-qualification is complete.

Once the application has gone through pre-qualification without error, the developer can submit (114) the entire application for full review and approval by a system or by a system developer (e.g., a developer responsible for the integrity of the platform). Submitting the application for review can include uploading the source code, the linked binary executable code of the application program, or both, to a server for automatic or manual review. Submitting the application for review can include uploading application resources and configuration information. The review can include a qualification portion and optionally, and additional approval portion. During the qualification portion of the review, a system can automatically determine whether the submitted application, sometimes in compiled and linked binary format only (e.g., without the source code), uses libraries, classes, or functions that are prohibited for use by the submitting developer. The qualification can also include automatically determining whether the application program uses deprecated libraries, classes, or functions, such that although the application program can execute properly at the time of the review, the libraries, classes, or functions are scheduled to be change or removed in the future, causing the application program to fail. The additional approval portion of the review can include, for example, determining that user interface of the application program conforms to guidelines provided with the SDK, or content provided by the application program conforms to local community standards.

The developer can receive (116) results of the qualification and approval. If the application program is not qualified or approved, a message can be sent to the developer. The message can include a statement that the application program did not pass the review process, a list of one or more errors that occurred, and an explanation for each error. The developer can redesign, reimplement, and retest the application program for submission again.

Upon qualification and approval from the review, the application program can be distributed (118). Distributing the application program can include storing the application program in a data store and providing the application program for download by other users (e.g., the general public).

In some implementations, the pre-qualification process can be performed without uploading the full application at step 114. For example, an application developer may wish to determine whether an application, or a portion of an application, under development will pass pre-qualification (e.g., is using appropriate APIs, configuration, resources, etc.). In this case, the process can include generating a description (106) of the application, or the portion of an application, submitting the description for prequalification (110), and receiving the prequalification warnings and/or errors (110) without performing the subsequent steps 112-114.

Example System of Automated Qualification

Figure 2:
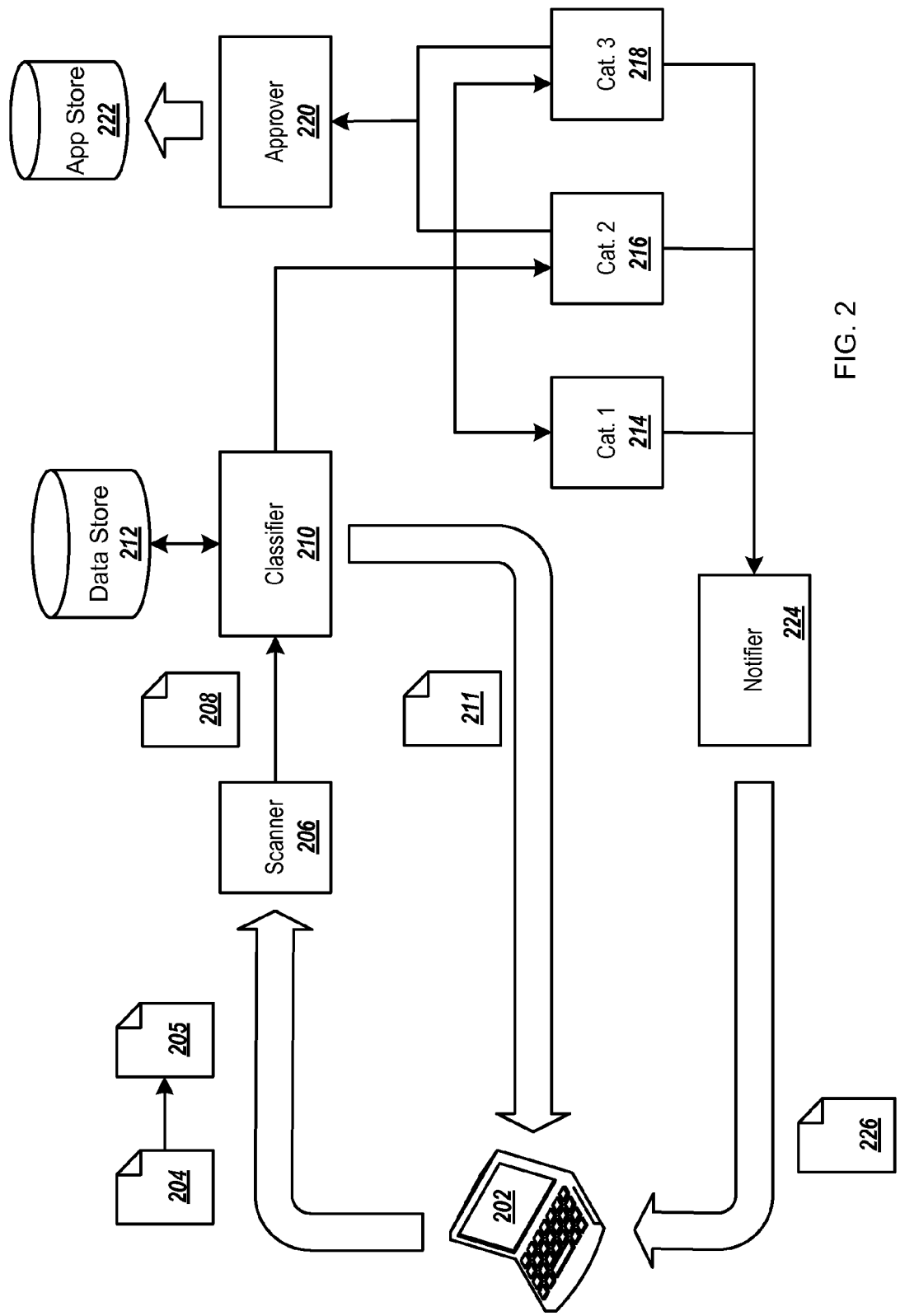
FIG. 2 illustrates components of an example system implementing client-side policy enforcement of developer API use.

FIG. 2 illustrates components of an example system implementing automated qualification of an application, including pre-qualification. A developer develops application code on computing device 202. The application code can be compiled into application 204. Application 204 can be pre-qualified for approval and distribution. The pre-qualification process can provide the application developer early notification of errors in application 204 that might prevent application 204 from being later approved for distribution. During the pre-qualification process, application description 205 can be generated based on application 204. For example, application description 205 can include binary files (e.g., compiled executables, libraries, etc.) and metadata (e.g., application configuration data, application resources, images, media, etc.) associated with application 204.

Application description 205 can be sent from computing device 202 to a server through a communication network. The server can include one or more hardware components (e.g., processors and storage devices) and one or more software components. The server can include subsystems that include scanner 206, classifier 210, approver 220, and notifier 224, among others. Each subsystem can include a hardware component, a software component, or both.

Scanner 206 can include a subsystem that scans application description 205 and generates scanned data (e.g., scanned symbols) 208. Scanner 206 can include various tools for analyzing application descriptions. An example scanner 206 can include an object file displaying tool (e.g., "otool" of Apple, Inc. or "nm" tool of Linux). Scanner 206 can include a subsystem that scans application description 205 for configuration data that can be used to pre-qualify, or disqualify, application 204. For example, scanner 206 can parse an info.plist file included in application description 205 to determine a name associated with the application. Scanned data 208 can include the scanned configuration information (e.g., application name).

Scanned data 208 can include names and version numbers of libraries described by application description 205, symbols (including indirect symbols that are defined in one source file and referenced in another source file), table of contents for a dynamically linked shared library, reference table of the dynamically linked shared library, module table of the dynamically linked shared library, and other information (e.g., configuration information). Scanned data 208 can include symbols in their original names (e.g., function "foo") or mangled names (e.g., function "_i_xyz_foo_para1_") or both. In some implementations, scanned data 208 can include automatically generated identifiers of functions (e.g., selectors). Scanned data 208 can be in American Standard Code for Information Interchange (ASCII) format, Unicode format, or another textual or binary format (e.g., a compressed archive format).

Classifier 210 can include a subsystem that generates warnings and errors for application description 205 based on comparison between scanned data 208 and application development policy information (e.g., symbol lists, approved/prohibited configuration data, approved/prohibited resources) in data store 212. For example, the warnings and errors can be generated during pre-qualification to give a developer early feedback that the developer's application is not using approved APIs. Data store 212 can include one or more lists of symbols, configuration data and/or resources.

Each list of symbols can include symbols with specified characteristics that can be used to determine if application 204 is using approved or restricted (e.g., prohibited) APIs. For example, a first symbol list in data store 212 can include symbols that developers using a published SDK are not permitted to access. Some examples of these symbols include names of system libraries, names of classes or methods of a system programming interface (SPI), names of classes that inherit from a system class, etc. A second symbol list in data store 212 can include names of classes that conflict with system classes, names of dangling classes or functions (e.g., classes or functions that are defined but not referenced), and names of libraries, classes, or functions that are deprecated. Libraries, classes, or functions can be deprecated if the libraries, classes, or functions, or their respective features are superseded or removed in future versions. A third list of symbols can include names of classes or functions that are subject to abuse. Names of classes or functions subject to abuse can include symbols in a published application programming interface (API) that can be used to hide a call to a unpublished API (e.g., an SPI). A fourth list of symbols can include names of classes or functions that are available to a particular application developer. For example, classes or functions that may generally be unavailable to developers may be made available to a particular developer by license agreement. A developer-specific list (e.g., developer specific policy) that identifies symbols that the developer is allowed to use can be stored in data store 212.

Data store 212 can also include configuration information and/or resources that can be compared with scanned data 208. For example, the configuration information can identify allowed and disallowed configuration data, allowed and disallowed resources, or any other application information.

Classifier 210 can compare scanned data 208 with the lists of symbols and metadata (e.g., application development policy data) in data store 212. For example, comparing the scanned data 208 with the lists of symbols in data store 212 can include calculating a match score indicating the likelihood that a symbol in scanned data 208 matches each of the lists of symbols. In some implementations, a perfect match score (e.g., 1.0) between a scanned symbol and a particular list can indicate that classifier 210 is certain that a symbol in that list is used in application 204. A less than perfect match score (e.g., 0.7) can indicate that there is less than one hundred percent likelihood that a symbol in the list is used.

Based on the comparison, classifier 210 can generate errors and/or warnings message 211. For example, classifier 210 can generate errors for symbols that are described in application description 205 and that application developers are not permitted to access (e.g., the first symbol list above). Classifier 210 can generate warnings for symbols that are described in application description 205 and that are related to deprecated libraries, classes or functions (e.g., the second symbol lists above). Warnings can also be generated when classifier 210 calculates less than a perfect match score (e.g., below a threshold score, below 0.7) for a symbol that would otherwise generate an error. For example, warnings can indicate to the application developer that the symbols that generated the warnings may be subject to later review and may cause rejection of the developer's application.

In some implementations, classifier 210 can upgrade or downgrade warnings and errors. For example, if a developer submits application description 205 having a symbol that is listed in the first symbol list, generally an error is generated. However, if developer has a license to use the symbol (e.g., the symbol is listed in the fourth symbol list associated with the developer) then the error can be downgraded to a warning or the error can be ignored. In some implementations, a warning can be upgraded to an error if a symbol described in application description 205 is subject to abuse (e.g., listed in the third symbol list above).

Once classifier 210 has compared scanned data 208 to the symbol lists, configuration data and/or resources in data store 212 and generated warnings and/or errors message 211, message 211 can be sent to computing device 202. Message 211 can include information identifying and/or describing warnings and/or errors. For example, message 211 can include only warnings, only errors, a combination of warnings and errors, or no warnings and no errors (e.g., indicating the application passed pre-qualification). When computing device 202 receives message 211, computing device can present a user interface for displaying the warnings and/or errors. For example, computing device 202 can display the user interface of FIG. 6. If computing device 202 receives a message 211 that includes errors, the application developer can be prevented from uploading application 204. Notifying the application developer of warnings and errors early in the approval process allows the application developer to resolve issues (e.g., API misuse, disallowed configuration, disallowed resources) early in the application approval process without having to wait for completion of the application approval process described below.

If computing device 202 receives a message 211 that includes no errors, application 204 can be sent from computing device 202 to a server through a communications network. For example, the entire application 204 can be sent to the server (e.g., rather than just the application description 205) once the application description 205 does not cause classifier 210 to generate any errors. The full application 204 can then be scanned by scanner 206 and classified by classifier 210.

Scanner 206 can include a subsystem that scans application 204 and generates scanned data 208 (see above). Scanner 206 can include various tools for analyzing applications. An example scanner 206 can include an object file displaying tool (e.g., "otool" of Apple, Inc. or "nm" tool of Linux).

Classifier 210 can include a subsystem that classifies (e.g., categorizes) application 204 based on comparison between scanned data 208 and symbol lists in symbol data store 212. Symbol data store 212 can include one or more lists of symbols. Each list of symbols can include symbols with specified characteristics that can be used to classify application 204. For example, a first symbol list in data store 212 can include symbols that developers using a published SDK are not permitted to access. Some examples of these symbols include names of system libraries, names of classes or methods of a system programming interface (SPI), names of classes that inherit from a system class, etc. A second symbol list in data store 212 can include names of classes that conflict with system classes, names of dangling classes or functions (e.g., classes or functions that are defined but not referenced), and names of libraries, classes, or functions that are deprecated. Libraries, classes, or functions can be deprecated if the libraries, classes, or functions, or their respective features are superseded or removed in future versions. A third list of symbols can include names of classes or functions that are subject to abuse. Names of classes or functions subject to abuse can include symbols in a published application programming interface (API) that can be used to hide a call to a unpublished API (e.g., an SPI).

Classifier 210 can compare scanned data 208 with the lists of symbols in data store 212. Comparing the scanned data 208 with the lists of symbols in data store 212 can include calculating a match score between the scanned data 208 with each of the lists of symbols. In some implementations, a perfect match score (e.g., 1.0) between a scanned symbol and a particular list can indicate that classifier 210 is certain that a symbol in that list is used in application 204. A less than perfect match score (e.g., 0.7) can indicate that there is less than one hundred percent likelihood that a symbol in the list is used.

Based on the comparison, classifier 210 can classify application 204 into one of multiple categories (e.g., category one 214, category two 216, and category three 218). Various actions can be respectively associated with the multiple categories. For example, category one 214 can be associated with an action of rejection. If application 204 is classified as category one 214, application 204 can be denied further approval and eventual distribution. Category one 214 applications can be put in a first notification queue.

Notifier 224 can include a subsystem that can send one or more notifications 226 to developers based on the classification of the application 204. For example, when application 204 is rejected, notifier 224 can send notification 226 indicating that application 204 is rejected and an explanation of reasons of the rejection (e.g., use of an SPI call). Rejected application 204 can be removed from the first notification queue and from the system.

If application 204 is classified as category two 216, application 204 can be unconditionally qualified. Category two 216 applications can be sent for approval by approver 220. Approver 220 can include a subsystem that approves qualified application 204. Approver 220 can include one or more automated processes for determining whether application 204 complies with various development guidelines that can include, for example, user interfaces specifications, user age requirement, or compliance with local or national community requirements. Once approved by approver 220, application 204 can be stored in application store 220, from where users can access (e.g., purchase for download) application 204. A reference (e.g., an identifier) of qualified application 204 can be put in a second notification queue. Notifier 224 can notify developers of applications in the second notification queue that the developers' applications are qualified. In some implementations, notification 226 sent by notifier 224 can include a warning that a symbol scanned from application 204 is deprecated.

If application 204 is classified as category three 218, application 204 can be conditionally qualified. Category three 218 applications can be temporarily put on hold before they are sent for approval or distribution, pending developer response to further inquiry. Category three 218 applications can be put in a third notification queue. Notifier 224 can send notification 226 to developers of applications that are in the third notification queue. Notification 226 for applications in the third notification queue can include the inquiry. The inquiry can seek user explanation, for example, on why a symbol scanned from application 204 is sufficiently similar to an SPI call. Application 204 can be sent to approver 220 if the system receives a satisfactory response from the developer. A satisfactory response can include, for example, an explanation of how the symbol is different from a system symbol even though the symbol is literally similar to the system symbol, or a change to another symbol.

Three example categories 214, 216, and 218 are shown in FIG. 2. In various implementations, more or fewer categories can be used. Furthermore, the categories can be associated with actions other than rejection, conditional qualification, and warning. Other actions are possible.

Figure 3:
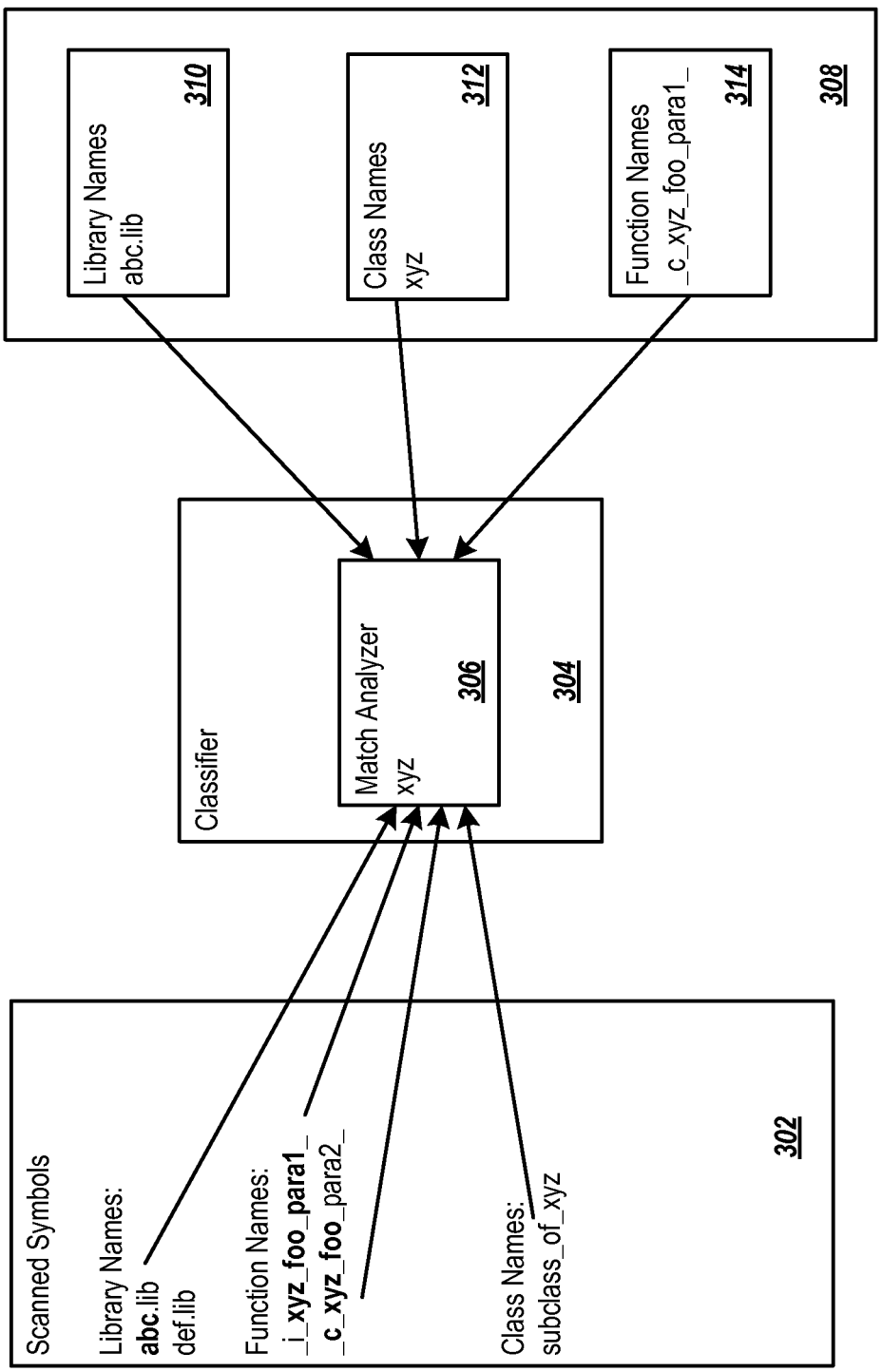
FIG. 3 illustrates an example match between symbols scanned from an application description and a reference list.

FIG. 3 illustrates an example match between symbols scanned from an application, or application description, and a reference list. The implementations described herein can also be used to match configuration data and/or resources from an application description and reference lists that identify approved and/or prohibited configuration data and resources.

Scanned symbols 302 can include symbols scanned from the application (e.g., application 204 of FIG. 2) or symbols scanned from the application description (e.g., application description 205 of FIG. 2). Scanned symbols 302 can include names of libraries linked into the application. The names can include names of statically linked libraries and dynamically linked libraries. Each library can include a collection of constants, macros, routines, classes, or a combination of two or more of the above. Some libraries can include routines for accessing system functions. For example, a system library for a mobile device platform can include routines for accessing a baseband processor that manages communications functions of the mobile device. Even if every class or function in the system library is declared "public" in an object-oriented programming environment, the library may not be provided to the general public for various reasons. Some other libraries not available to the general public can include libraries under testing. The libraries under testing can be made available only to a selected group of developers (e.g., beta testers). To illustrate, a library having the name "abc.lib" as shown in FIG. 3 is a system library or a library under testing and is not to be linked into the application.

Scanned symbols 302 can include class names and function names. A function can include a global function, a local function, a class method, an instance method, or any other executable routine. In some implementations, names of functions can include mangled (or decorated) names. For example, a mangled function name can include an indicator "i" or "c" that indicates whether the function is an instance method or a class method. The mangled function name can also include a name of the class (e.g., "xyz"). In some implementations, each method can correspond to a unique identifier (e.g., a selector) of the method, in addition to or in place of a mangled name. The selector can include a unique symbol (e.g., an integer) assigned to the method. Scanned symbols 302 can include text (e.g., ASCII) or binary form of the selector.

Classifier 304 can compare the scanned symbols 302 to reference list 308, which can include a list of known symbols. Reference list 308 can include library names 310, class names 312, and function names 314. Function names 314 can include global or local functions, class methods, and instance methods. In some implementations, function names 314 can include method identifiers (e.g., selectors). In some implementations, reference list 308 can be a blacklist. If a match between a scanned symbol and a symbol in the list is found, the application from which the symbol is scanned can be automatically rejected.

Classifier 304 can be a classifier such as classifier 210 of FIG. 2. Classifier 304 can include match analyzer 306 that compares scanned symbols 302 with symbols in reference list 308. In some implementations, a match is found if there is an exact match. For example, classifier 304 can determine that scanned symbols 302 matches reference list 308 when a library name (e.g., "abc.lib") in scanned symbols 302 literally matches a library name in reference list 308, or when a selector in scanned symbol 302 matches a selector in function names 314 section of reference list 308.

In some implementations, match analyzer 306 can identify a match even when an exact match does not exist. Match analyzer 306 can calculate a match score between a scanned symbol and a symbol in reference list 308. The match score can indicate a similarity between portions of a first symbol (e.g., the scanned symbol) and a second symbol (e.g., the symbol in reference list 308). For example, a first symbol can have mangled name _i_xyz_foo_para1_. The mangled name can indicate that the application includes an instance method (e.g., a method that is associated with an object of a class) "foo" associated with class "xyz" with parameter "para1." This function is not identical, but is similar, to a method name in reference list 308 having a mangled name _c_xyz_foo_para1_, indicating that the second symbol is a class method (or static method, a method associated with a class "xyz"), as indicated by the "c" prefix. A class method can be treated differently from an instance method, even if they have the same name. In this example, other than the class/instance distinction, the first symbol and second symbol are identical. The identical portions are indicated in bold type in scanned symbols 302. Match analyzer 306 can calculate a match score based on the difference and similarity. Likewise, a first symbol _c_xyz_foo_para2_ partially match the second symbol _c_xyz_foo_para1_.

In some implementations, match analyzer 306 can identify a match based on class inheritance. Match analyzer 306 can identify classes of the scanned symbols 302 to determine whether a particular class (e.g., "subclass_of_xyz") is a subclass of a class (e.g., class "xyz") listed in list 308.

Classifier 304 can determine whether the application is classified into a category based on match scores calculated by match analyzer 306 between scanned symbol 302 and each reference list 308. In some implementations, the application is classified into a category (e.g., a "rejection" category) if match analyzer 306 determines that there is an exact match between a scanned symbol (e.g., "abc.lib") and a symbol (e.g., "abc.lib") in a list (e.g., a list of unpublished system symbols). In some implementations, the application is classified into a category (e.g., the "rejection" category) if, although there are no exact matches, the match score of a scanned symbol satisfies a match threshold, indicating that it is highly likely that the application is using an unpublished library, class, or function. In some implementations, the application is classified into a category (e.g., the "rejection" category) if an aggregation of a group of scanned symbols that are similar to the known symbols results in an aggregated match score that satisfied an aggregated match threshold. Aggregating of the group of scanned symbols can include calculating the aggregated match score using a number of scanned symbols that match the known symbols in the list, and the match score of each scanned symbol.

Classifier 304 can classify the application in a tiered manner. Multiple reference lists 308 can be used. Each list can correspond to a tier. For example, a tier 1 list can include unpublished symbols. A tier 2 list can include a list of symbols that are published, but, if appeared together, can indicate a likelihood of abuse based on historical data, or can be used to hide calls to unpublished SPI functions. A tier 3 list can include published but deprecated symbols. Each tier can correspond to a different action (e.g., reject, hold, or warn). The system can start by comparing scanned symbols 301 with tier 1 lists, tier 2 lists, and so on, in the order of the tiers.

In addition to or alternative to the tiered lists, classifier 304 can use characteristics of scanned symbols 302 to classify the application. For example, classifier 304 can specify that a threshold number of libraries are required of each application. If a number of linked libraries in scanned symbols 302 fails to satisfy the threshold number of libraries, classifier 304 can determine that the application is compiled using an unauthorized compiler or is written to purposefully circumvent unpublished libraries, classes, or functions. Accordingly, classifier 304 can classify the application such that the application will be rejected or put on hold.

Classifier 304 can generate warnings and errors during pre-qualification based on match scores calculated by match analyzer 306 between scanned symbol 302 and each reference list 308. For example, errors can be generated when the application description contains information that would cause classifier 304 to place an application in the rejection category, described above. Warnings can be generated when the application description contains information that would cause classifier 304 to place an application in a category (e.g., hold) other than rejection or approve.

Figure 4:
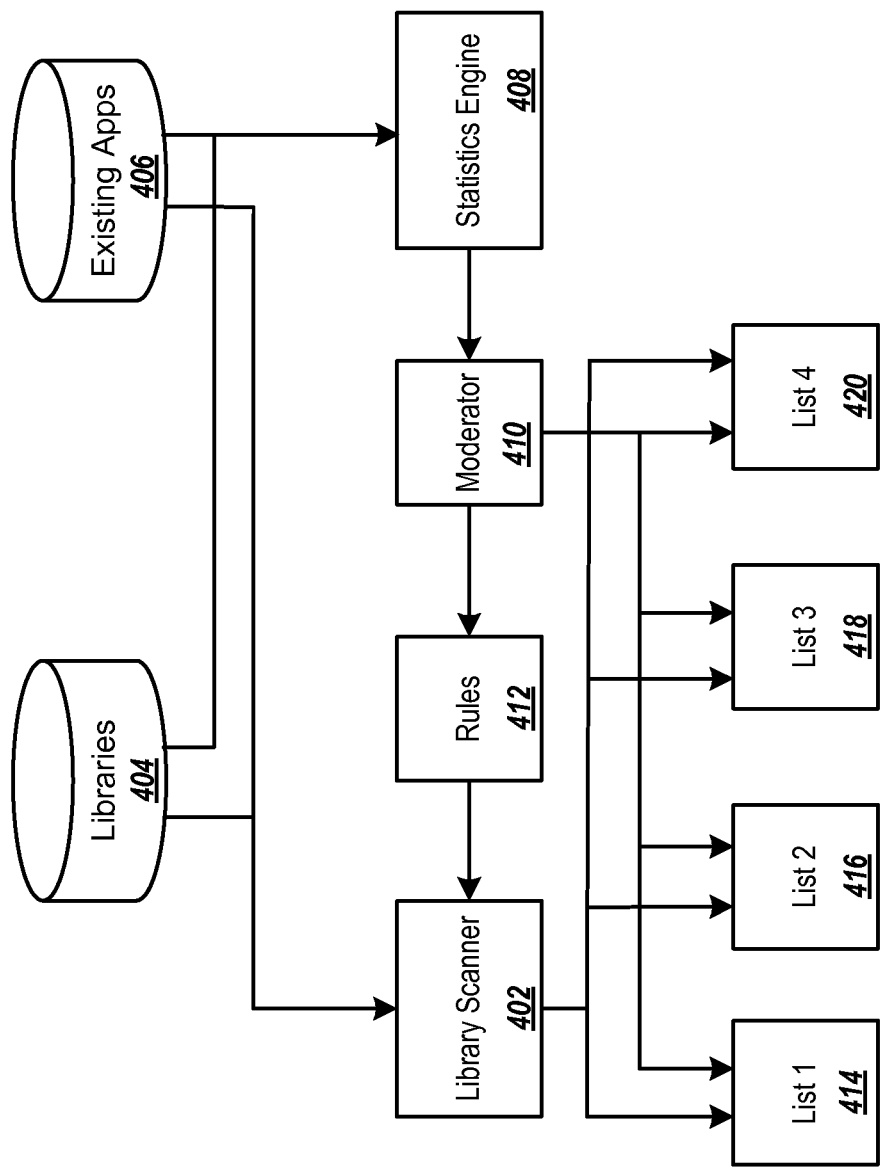
FIG. 4 is a block diagram illustrating an example system that creates reference lists.

FIG. 4 is a block diagram illustrating an example system that creates reference lists. The reference lists can be created from data store 404 that includes existing libraries. The existing libraries can include published libraries (e.g., the libraries that have been provided to developers in an SDK) and unpublished libraries (e.g., system libraries, experimental libraries, or proprietary libraries). Additionally or alternatively, the lists can be created from data store 406 that includes existing applications that have been qualified, applications that are created by system developers, or applications that are created by a selected group of developers (e.g., developers who are entitled to bypass the review process).

Library scanner 402 can scan libraries in data store 404 and applications in data store 406 to create reference lists 414, 416, 418, and 420 using rules 412. Rules 412 can specify access privileges of each library, class, and function. For example, rules 412 can specify which library is a published library, which library is an unpublished library, which classes in a particular library have limited access privilege, and which functions in a library or which methods in a class have limited access privilege. In some implementations, rules 412 can associate the access privileges with various licenses granted to developers. For example, a first license can specify that a developer under the first license can access a first set of libraries, classes, or functions. A second license can specify that a developer under the second license can access a second set of libraries, classes, or functions that are different from the first set. Library scanner can create a set of reference lists to be associated with each license or category of license. When a developer submits an application for qualification, a current license for the user is determined (e.g., based on the user's identification as the user signed up to acquire the SDK), and a corresponding set of references lists is used to qualify, or pre-qualify, the application submitted by the user.

Statistics engine 408 can monitor the libraries of data store 404 and existing applications of data store 406 for patterns of symbol usage. Monitoring can include analyzing the libraries and existing applications to determine a frequency of use of various libraries, classes, and functions. Statistics engine 408 can submit results of the monitoring to moderator 410. Moderator 410 can determine whether a particular symbol is to be moved from a first reference list to a second reference list based on the results. For example, statistics engine 408 can determine a frequency with which a function is referenced. The statistic engine 408 can determine that the frequency satisfies a usage threshold. According to current rules 412, the function is scheduled to be removed in a future release of the SDK. Based on the usage, moderator 410 can determine that the removal of the function should be delayed to avoid concurrent invalidations of a large number of applications. Moderator 410 can send a notice of the usage to a system developer and recommend that the function is to be preserved. Upon receiving a response from the system developer indicating that the function is to be preserved, moderator 410 can modify rule 412 to specify that the function is not to be deprecated. Additionally or alternatively, moderator 410 can modify one or more of reference lists 414, 416, 418, and 420, for example, to remove a symbol of the function from a deprecated function list and insert it into a permissible function list.

Likewise, moderator 410 can identify which library is used by developers the most, and recommend to the system developer that the most used library can be a first choice of improvement in a next release of the SDK. Moderator 410 can identify an unpublished library that has caused most rejections of applications, and recommend converting the unpublished library or a modified version of the unpublished library into a published library.

Example System of Pre-Qualification

FIG. 5 illustrates components of example system 500 where a developer can pre-qualify an application before submitting the application for review. Pre-qualification can be utilized to reduce the time required for review by eliminating preventable rejections from the system. Pre-qualification can provide the developer with early feedback that allows the developer to fix problems with the application before uploading the application for approval and distribution thereby saving the developer time during the development, review, approval and distribution process.

A developer can create an application on computing device 502 using an SDK under a license for a platform (e.g., a mobile device development platform). The developer may not knowingly use libraries, classes, or functions to which the developer has no access according to the license. However, the developer links in one or more third party libraries into the executable of the application. The developer can run an application description utility on the application to generate an application description. The developer can send application description 504 to inspector 506. Inspector 506 can include a set of instructions executed on a server that is connected to computing device 502 through a communications network. The server can be the same server that receives the full application for review, approval and distribution. Inspector 506 can be a stand-alone application program, a plug-in of an IDE, or a web-based service. Inspector 506 can include, for example, some or all of components scanner 206, classifier 210, and notifier 224 as described above with respect to FIG. 2.

Inspector 506 can be coupled to data store 508, which can store one or more symbol, configuration and resource data reference lists against which the symbol, configuration and resource data scanned from application description 504 can be compared. For example, a reference list can identify prohibited symbols, configurations, and/or resources. A reference list can identify allowed symbols, configurations, and/or resources. A first reference list can be used to modify a second reference list. For example, a developer-specific reference list can identify APIs that the developer is allowed to use (e.g., according to a developer license) even though the APIs may be included on a prohibited API reference list. The reference lists in data store 508 can be stored remotely (e.g., on a server of the publisher of the SDK or on a server of a third party). The reference lists in data store 508 can be updated periodically or upon request.

For example, inspector 506 can scan application description 504 for symbols and compare the scanned symbols with symbols in the reference lists stored in data store 508. Inspector 506 can identify one or more suspicious symbols in the scanned symbols. Each suspicious symbol can be a symbol that matches a symbol in a reference list of symbols that the developer is not permitted to access, a reference list of symbols that are prone to be abused, or a reference list of symbols of libraries, classes, or functions to be removed in the future. Likewise, inspector 506 can scan application description 504 for configuration data and/or resources, compare the scanned configuration data and/or resources with configuration data and resources in the reference lists stored in data store 508, and identify suspicious configuration data and/or resources.

Inspector 506 can compile a list of warnings and errors associated with the suspicious symbols, configuration data and/or resources and send notification 510 to formatter 512. Formatter 512 can identify the warnings and errors from notification 510, associate each warning and error with a reason of suspicion, and format the errors, warnings and the reasons into formatted notification 514. Formatted notification 514 can be sent to computing device 502 for display on a display screen. The developer can modify application 504 in response, for example, by linking a different library and repeat the pre-qualification process, until application description 504 no longer generates errors and warnings. The developer can submit the pre-qualified application 504 for approval once the pre-qualification process produces no errors.

In addition to pre-qualifying an application, system 500 can qualify other binaries. For example, inspector 506 can scan and pre-qualify object code (e.g., a compiled section of an application program) or a binary library (e.g., a downloaded third party library). In some implementations, inspector 506 can use reference lists in data store 508 to modify warnings and errors (e.g., upgrade to error, downgrade to warning or no error) based on a license associated with an SDK. For example, if a developer acquires a new license that grants the developer more access privileges (e.g., access privileges to a system library that is previously not accessible by the developer), reference lists in data store 508 can be modified to reflect the terms of the new license and inspector 506 can upgrade and/or downgrade warnings and errors according to the modified reference list associated with the developer.

FIG. 6 illustrates example user interface 600 for notifying a developer of errors and warnings identified for an application description. Example user interface 600 can be a user interface for displaying formatted notification 514 of FIG. 5, or a user interface for displaying notification 226 as described above with respect to FIG. 2. Example user interface 600 can include at least portion of a web page.

Error section 602 of user interface 600 can include a display area of user interface 600 that displays errors. For example, error section 602 can display a name of an unpublished system library (e.g., "abc.lib") that is not accessible by the developer under a current license. Error explanation section 604 can include a display area of user interface 600 that displays explanation of the errors, as well as suggested change (e.g., "Consider using another library"). When multiple errors are present, error section 602 can be configured to accept a user input scrolling the errors and selecting a particular error. Explanation section 604 can display the explanation of the selected error.

Warning section 606 can include a display area of user interface 600 that displays warnings. In some implementations, warning section 606 can display a name of a class (e.g., "xyz") that is historically subject to abuse. For example, class "xyz" from in the library linked in by the user can include features that are known to be subject to security attack by hackers. Warning section 606 can also display names of libraries, classes, and functions (e.g., class function "foo" and instance function "bar") that will be changed or removed.

Warning explanation section 608 can include a display area of user interface 600 that displays explanation of the warnings, as well as suggested change. When multiple warnings are present, warnings section 606 can be configured to accept a user input scrolling the warnings and selecting a particular warning. Explanation section 604 can display the explanation of the selected warning.

Example Pre-Qualification and Qualification Processes

Figure 7A:
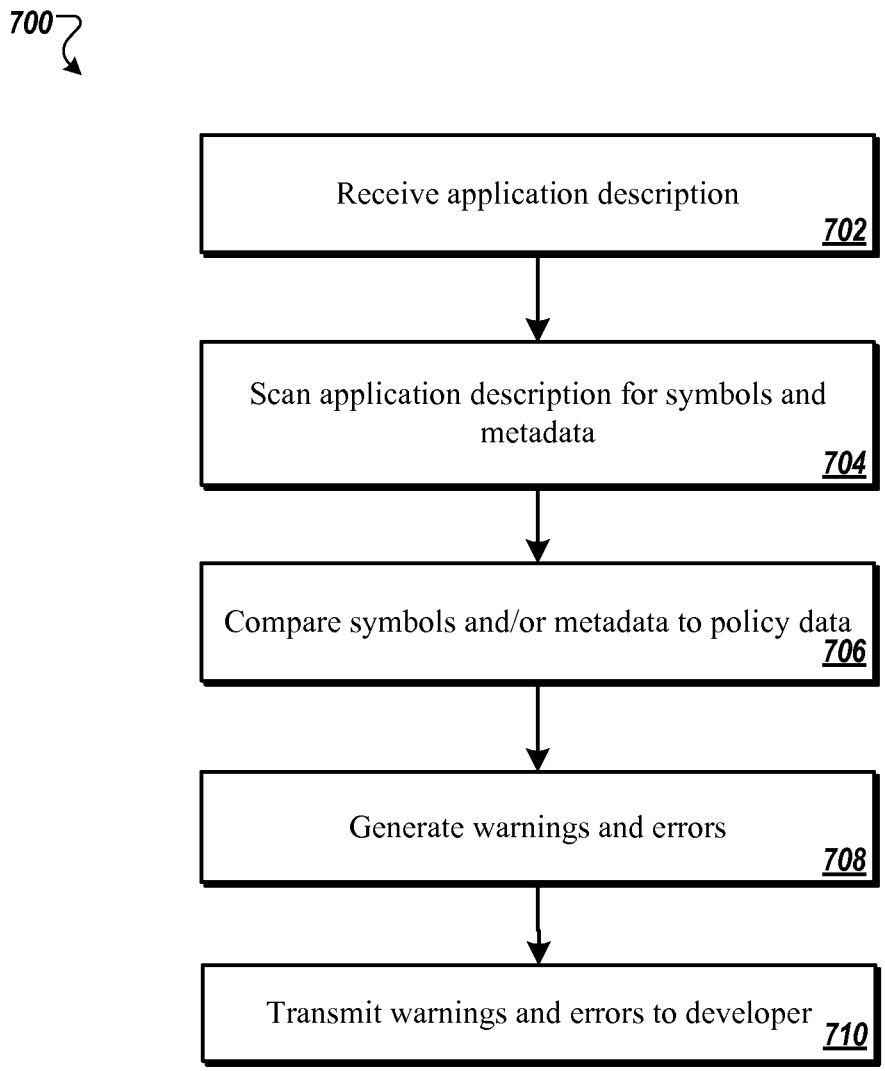
FIG. 7A is a flowchart illustrating example process of pre-qualifying an application.

FIG. 7A is a flowchart illustrating example process 700 of pre-qualifying an application. For convenience, process 700 will be described in reference to a system that implements process 700. The system can receive an application description (702). The application description can include compiled and linked executable files (e.g., binary files, mach-o files, compiled libraries, etc.). The application description can include application metadata (e.g., info.plist file data, mobile provisioning file information, embedded provisioning file information, resources, and other configuration information).

The system can scan the application description for symbols and metadata (704). For example, the system can scan for symbols contained in the executable binary files that represent libraries, classes and functions that are referenced in the executable binary files. The system can scan the metadata for configuration information (e.g., product name, version number, etc.).

The system can compare the symbols and/or metadata to policy data (706). For example, the system can compare the symbols to API policy information that specifies which APIs an application developer can use. The system can compare the symbols and/or metadata to general policy data (e.g., policies that apply to all developers, reference lists). The system can compare the symbols and/or metadata to developer-specific policy data (e.g., policy data that reflects the terms of a developer's license).

If the symbols and metadata included in the application description do not comply with the policies defined in the policy data, the system can generate warnings and/or errors that can be transmitted (710) to the developer to notify the developer that the application does not comply with the policies. The application developer can be notified that that the application developer will not be able to upload the application for qualification and approval until the errors are resolved.

Figure 7B:
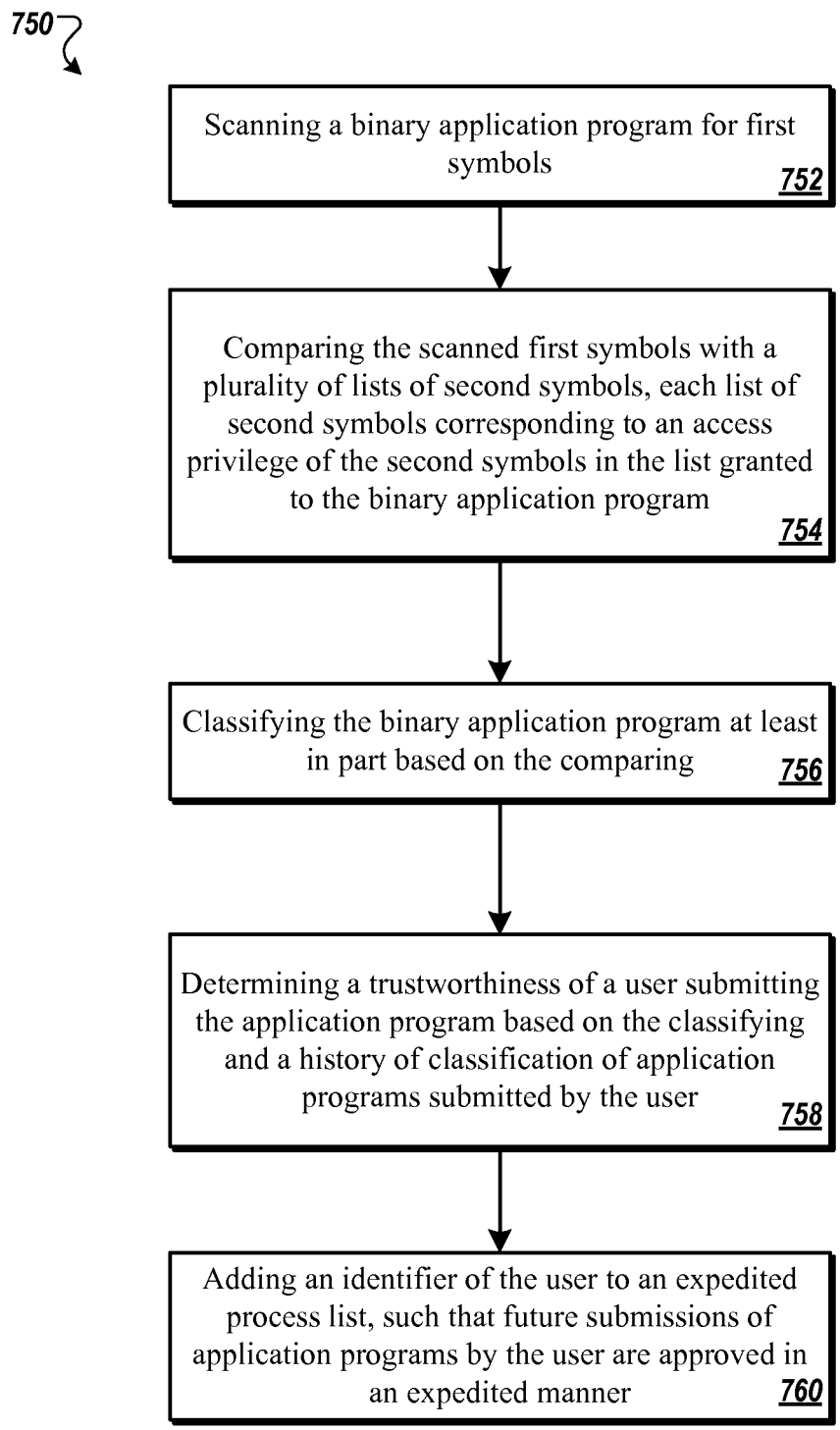
FIG. 7B is a flowchart illustrating an example process of automatically qualifying a binary application program.

FIG. 7B is a flowchart illustrating example process 750 of automatically qualifying an application. For convenience, process 750 will be described in reference to a system that implements process 750.

The system can scan (752) an application for first symbols. The application can be an application program submitted by a developer for approval. The first symbols can include at least one of a library name, a class name, and a function name. The function name can include a mangled function name, a function identifier (e.g., a selector), or both. The function can include a global function, a local function name, or a class method or an instance method, or any executable routine.

The system can compare (754) the scanned first symbols with multiple lists of second symbols. Each of the multiple lists of second symbols can correspond to a specified access privilege of the second symbols in the lists that has been granted to the application. The second symbols can include at least one of a library name, a class name, and a function name. For example, the list of second symbols can include a first list of system symbols, including names of system libraries, classes, or functions. Under a current license of the developer submitting the application, an access from the submitted application to the system libraries, classes, or functions in the first list can be prohibited.

The list of second symbols used in stage 754 can include a second list of published symbols. Under the current license, access from the application to the published symbols is permitted for an indefinite amount of time. The list of second symbols used in stage 754 can include a third list of deprecated symbols. The access to the deprecated symbols can be permitted for a limited amount of time (e.g., until a deprecated library, class, or function is removed).

In stage 754, comparing the scanned first symbols with the multiple lists of second symbols can include calculating a likelihood that the scanned first symbols match one of the lists of the second symbols. Calculating the likelihood can include calculating a match score between each scanned first symbol and each second symbol of a list of second symbols. The match score can measure a probability that a scanned first symbol is equivalent to a second symbol, even when the scanned first symbol literally differs from the second symbol. The system can associate the match score to the scanned first symbol, and calculate the likelihood based on an aggregation of the match scores. In some implementations, calculating the likelihood can include identifying one or more of the scanned first symbols whose associated matching scores exceed a threshold, and calculating the likelihood based on a ratio between the identified one or more of the scanned first symbols and a number of all of the scanned first symbols.

The system can classify (756) the application at least in part based on the comparing. In some implementations, the system can provide trustworthy users preferred status. The system can determine (758) a trustworthiness of a user (e.g., the developer submitting the application program currently being qualified) based on the classification of the currently submitted application and a history of classification of application programs submitted by the developer. For example, if the total number of applications submitted by the developer satisfies a threshold number, and a threshold percentage of the submitted applications (e.g., 100%) are qualified, the developer can be designated as a trustworthy developer.

The system can add (760) an identifier of the user to an expedited process list, such that future submissions of applications by the user are qualified in an expedited manner. Approving an application in the expedited manner can include moving the application to a head of a queue of application waiting to be examined. Approving an application in the expedited manner can include giving more weight to the symbols used in the application when the system determines a frequency of use of the symbols.

In some implementations, process 750 can optionally include creating the lists of second symbols automatically. Creating the lists of second symbols can include determining a popularity score of a first symbol scanned from historically submitted applications, and adding the first symbol to a list of published symbols the access to which is permitted for an indefinite amount of time based on the popularity score.

Figure 8A:
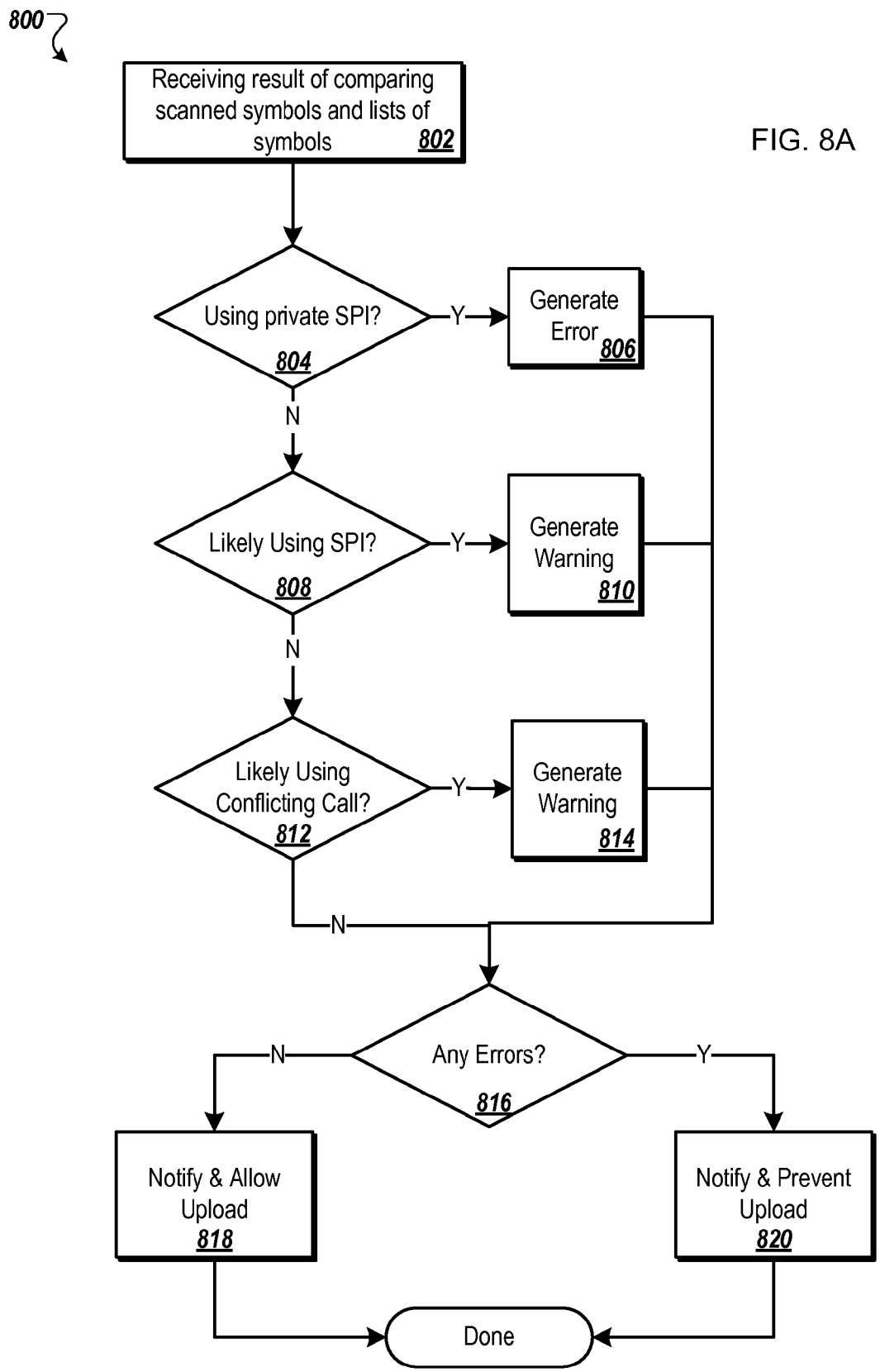
FIG. 8A is a flowchart illustrating example process for generating warnings and errors from on an application description.

FIG. 8A is a flowchart illustrating example process 800 for generating warnings and errors from on an application description. In some implementations, example process 800 can be a process that corresponds to stage 708 of example process 700 of FIG. 7A. For convenience, process 800 will be described in reference to a system that implements process 800.

The system can receive (802) results of comparison between first symbols scanned from an application description and lists of second symbols. The application description can be submitted by a user (e.g., a developer). Pre-qualifying the application can include performing an action on the user-submitted application description.

The system can make a first determination at stage 804 on whether to generate an error. The first determination can include determining whether the scanned first symbols include unpublished symbols. The first determination can include determining whether the scanned first symbols include symbols that indicate that the application uses classes inherited from system classes, or classes private to the system developers. The first determination can include determining whether the scanned first symbols include names of system libraries, or libraries private to the system developers. Upon determining that an error should be generated, the system can generate an error (806).

Upon determining that an error need not be generated, the system can make a second determination at stage 808 on whether to generate a warning. The second determination can include determining that the likelihood that at least one of the first symbols scanned from the application uses a system function or a function private to a system developer satisfies a threshold. The likelihood can be calculated based on the match scores associated with the first symbols. For example, the likelihood can be calculated based on an aggregation of the match scores. Upon determining that a warning should be generated, the system can generate the warning (810).

The system can make a third determine whether to generate a warning at stage 812. The third determination can include determining whether a class name in the scanned symbols is identical to a name of a system class or a private class, but the scanned symbols excludes a library containing the system class or private class. This can indicate that the application uses a class definition that conflicts with the system class or private class. The third determination can include determining whether any libraries, classes, or functions are dangling. For example, the system can determine that a class or a function is defined but not referenced. The third determination can include determining whether the scanned first symbols include a deprecated library, class, or function. Upon determining that a warning should be generated at stage 814, the system can generate the warning (814).

In some implementations, at least one of the second determination of stage 808 and the third determination of stage 812 can include determining whether the scanned symbols include symbols identified as part of an API that is subject to abuse. An API that is subject to abuse can include a published API that can be used to hide system or private API usage. Additionally or alternatively, at least one of the second determination of stage 808 and the third determination of stage 812 can include determining whether a number of libraries linked into the application falls below a threshold. If there are too few linked libraries, the system can determine that an unapproved library is used, which can circumvent system or private API usage.

Moreover, stages 804, 808 and 812 can include determining whether the scanned symbols include symbols identified as part of an API that the developer has a license to use. For example, if the developer has a license to use an API that generated an error or a warning, the error or warning may be downgraded such that the error or warning is disregarded, no error or warning notification is sent to the developer, and the developer may be allowed to upload the application for review, approval and distribution.

Upon determining that no errors have been generated during pre-qualification (816), the system can notify (818) the developer of any warnings that have been generated and allow the developer to upload the application corresponding to the application description. For example, the system can send a message to the developer that warns the developer that the system has identified a likely call to an unpublished function.

Upon determining that at least one error was generated during pre-qualification, the system can notify (820) the developer of the reasons for the error and prevent the developer from uploading the full application for approval and distribution. The notification can include a description of the reasons for the errors, or details describing which symbols have caused the errors.

Figure 8B:
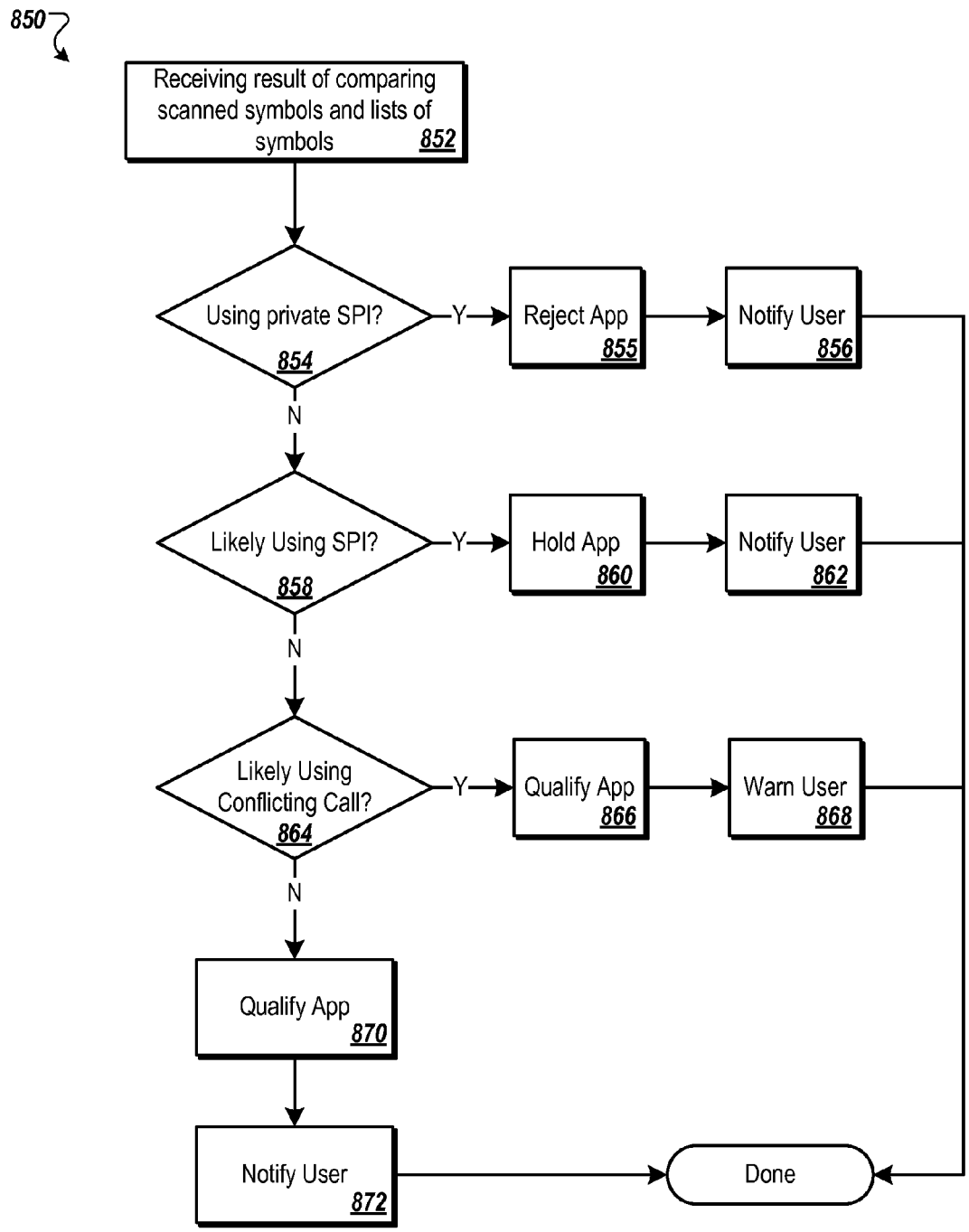
FIG. 8B is a flowchart illustrating an example process of classifying a binary application program.

FIG. 8B is a flowchart illustrating example process 850 of classifying an application. In some implementations, example process 850 can be a process that corresponds to stage 756 of example process 750 of FIG. 7B. For convenience, process 800 will be described in reference to a system that implements process 850.

The system can receive (852) results of comparison between first symbols scanned from an application and lists of second symbols. The application can be submitted by a user (e.g., a developer). Classifying the application can include performing an action on the user-submitted application.

The system can make a first determination at stage 854 on whether to take a rejection action. The first determination can include determining whether the scanned first symbols include unpublished symbols. The first determination can include determining whether the scanned first symbols include symbols that indicate that the application uses classes inherited from system classes, or classes private to the system developers. The first determination can include determining whether the scanned first symbols include names of system libraries, or libraries private to the system developers.

Upon determining that the rejection action is to be taken, the system can automatically reject (855) the application. Rejecting the application can include discarding the application. The system can notify (856) the developer reasons for the rejection. The notification can be send as an electronic mail. The electronic mail can include a summary of the reasons for the rejection, or details describing which symbols have caused the rejection.

Upon determining that the rejection action need not be taken, the system can make a second determination at stage 858 on whether to take a hold action. The second determination can include determining that the likelihood that at least one of the first symbols scanned from the application uses a system function or a function private to a system developer satisfies a threshold. The likelihood can be calculated based on the match scores associated with the first symbols. For example, the likelihood can be calculated based on an aggregation of the match scores.

Upon determining that the hold action is to be taken, the system can hold (860) the application in an on-hold queue. The system can automatically notify (862) the developer that the system has identified a likely call to an unpublished function. The notification can include an inquiry for explanation with regard to the symbol. Upon receiving a satisfactory response to the inquiry, the system can move the application from the on-hold queue and send the application for further approval or distribution.

Upon determining that the hold action need not be taken, the system can make a third determination at stage 864 on whether to take a warn action. The third determination can include determining whether a class name in the scanned symbols is identical to a name of a system class or a private class, but the scanned symbols excludes a library containing the system class or private class. This can indicate that the application uses a class definition that conflicts with the system class or private class. The third determination can include determining whether any libraries, classes, or functions are dangling. For example, the system can determine that a class or a function is defined by not referenced. The third determination can include determining whether the scanned first symbols include a deprecated library, class, or function.

Upon determining that the warn action is to be taken, the system can qualify (866) the application. The application program can be subject to further approval. The system can warn (868) the developer by sending a warning message to the developer informing the developer of the determination.

In some implementations, at least one of the second determination of stage 808 and the third determination of stage 864 can include determining whether the scanned symbols include symbols identified as part of an API that is subject to abuse. An API that is subject to abuse can include a published API that can be used to hide system or private API usage. Additionally or alternatively, at least one of the second determination of stage 858 and the third determination of stage 864 can include determining whether a number of libraries linked into the application falls below a threshold. If there are too few linked libraries, the system can determine that an unapproved library is used, which can circumvent system or private API usage.

Upon determining that the warn action need not be taken, the system can qualify (870) the submitted application and notify (872) the developer submitting the application that the application has been qualified.

Example System Architecture

Figure 9:
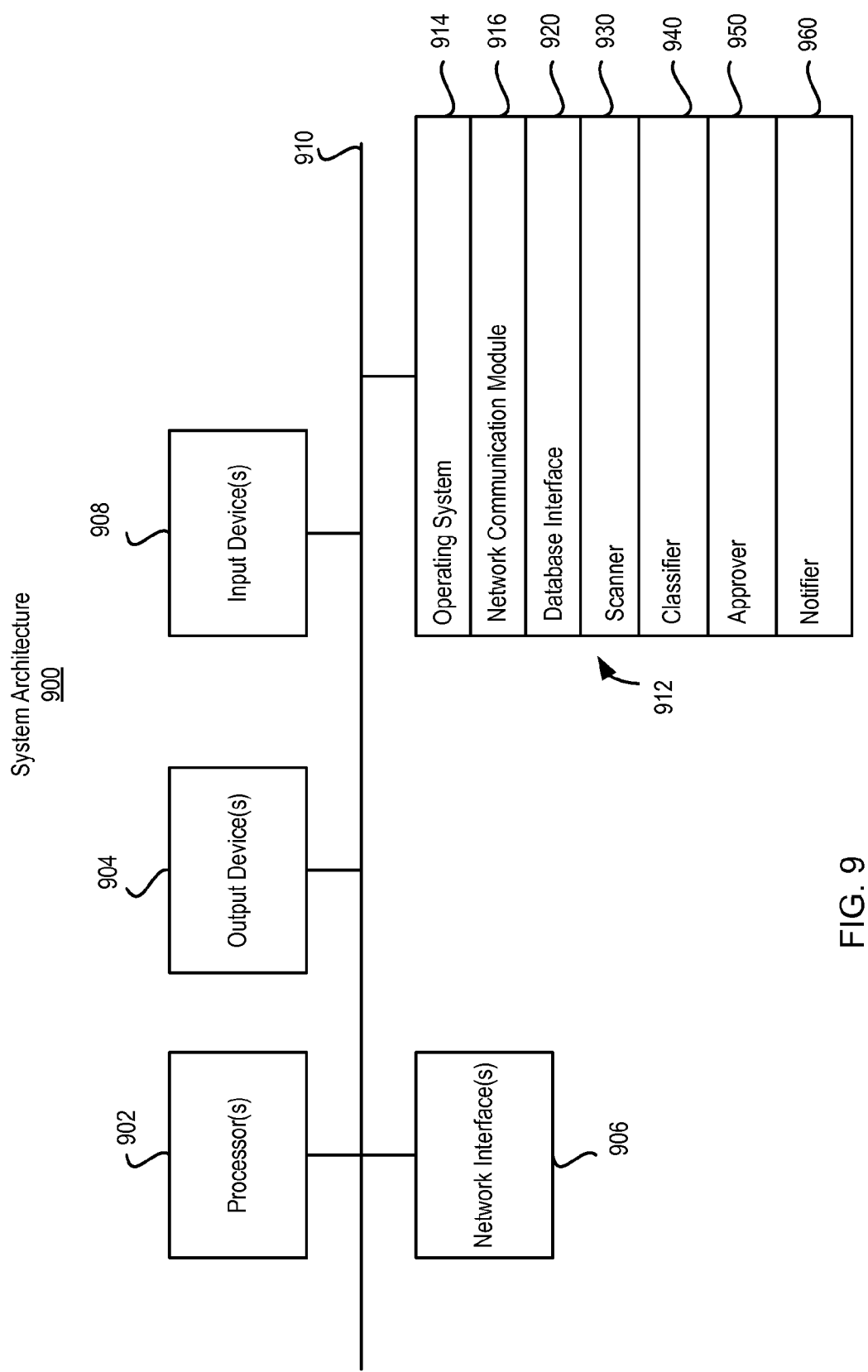
FIG. 9 is a block diagram of an example system architecture for implementing the features and operations described in reference to FIGS. 1-8.

FIG. 9 is a block diagram of an example system architecture 900 for implementing the features and operations described in reference to FIGS. 1-8. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., Mac OS® server, Windows® NT server), network communication module 916, database interface 920, scanner 930, classifier 940, approver 950, and notifier 960, as described in reference to FIGS. 1-8. Operating system 914 can be multi-user, multiprocessing, multitasking, multithreading, real time, etc. Operating system 914 performs basic tasks, including but not limited to: recognizing input from and providing output to devices 906, 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can include interface to various data stores such as data stores 212, 404, and 416, as described above in reference to FIG. 2 and FIG. 4. Scanner 930 can include a scanner that corresponds to scanner 206 as described above with respect to FIG. 2. Classifier 940 can include a classifier that corresponds to classifier 210 as described above in reference to FIG. 2 and classifier 304 as described above with respect to FIG. 3. Approver 950 can include an approver that corresponds to approver 220 as described above in reference to FIG. 2. Notifier 960 can include a notifier such as notifier 224 as described above in reference to FIG. 2.

Architecture 900 can be included in any device capable of hosting a database application program. Architecture 900 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications can be made without departing from the spirit and scope of the disclosure. For example, an application is described. In various implementations, binaries other than application programs (e.g., libraries) or application programs other than binaries (e.g., applications written in a script language in plain text) can be automatically qualified. Accordingly, other implementations are within the scope of the following claims.

What is claimed is:

1. A method comprising:
   receiving, at a distribution device, an application description prequalification request comprising an application description describing an application stored at a developer device, the application description identifies one or more symbols used by the application, and where the application description is distinct from the application;
   determining, by the distribution device, that the application description is not in compliance with one or more application development policies, wherein the application development policies comprise general policy data and specific policy data, the general policy data applicable for all application descriptions and the specific policy data applicable to the received application description, and where compliance is determined based on comparing the one or more symbols identified in the application description and the general policy data and specific policy data of the application development policies;
   generating, by the distribution device, at least one error when the application description is not in compliance with at least one of the general policy data and the specific policy data of the application development policies; and
   in response to generating the error, preventing, by the distribution device, the application from being uploaded from the developer device to the distribution device for review, approval, and distribution.

2. The method of claim 1, further comprising:
   determining, by the distribution device, that the application description is in compliance with one or more application development policies;
   allowing the application to be uploaded from the developer device when the application description is in compliance with the application development policies.

3. The method of claim 1, and further comprising:
   generating warnings when the application description describes deprecated symbols.

4. The method of claim 1, wherein the specific policy data identify developer-licensed application programming interfaces, and further comprising:
   comparing one or more application programming interfaces identified in the application description to the developer-licensed application programming interfaces in the application development policies;
   downgrading the error when the one or more application programming interfaces matches a developer-licensed application programming interface; and
   in response to downgrading the error, enabling, by the distribution device, the application to be uploaded from the developer device to the distribution device for review, approval, and distribution.

5. A method comprising:
   generating, by a developer device, an application description for at least a portion of an application;
   transmitting, by the developer device, an application description prequalification request including the application description to a distribution device, the application description identifies one or more symbols used by the application, and where the application description is distinct from the application;
   receiving a message from the distribution device indicating that the application description violates an application development policy, wherein the application development policy comprises general policy data and specific policy data, the general policy data applicable for all application descriptions and the specific policy data applicable to the received application description, and where the violation is determined based on a comparison of the one or more symbols identified in the application description and the general policy data and specific policy data of the application development policy; and
   preventing, by the developer device, the application from being uploaded to the distribution device for review, approval, and distribution when the message indicates that the application violates at least one of the general policy data and the specific policy data of the application development policy.

6. The method of claim 5, wherein the application description is transmitted to the distribution device over a synchronous connection.

7. The method of claim 5, further comprising:
   receiving a message from the distribution device indicating that the application description describes an application that complies with application development policies configured at the server;
   uploading, by the developer device, the application to the distribution device for review, approval, and distribution when the message indicates that the application complies with the application development policy.

8. The method of claim 5, wherein the application description includes binary files associated with the application.

9. The method of claim 5, wherein the application description includes configuration data for the application.

10. The method of claim 5, wherein the application description includes resources associated with the application.

11. A non-transitory computer-readable medium including one or more instructions which, when executed by one or more processors, causes the one or more processors to:
    receive, at a distribution device, an application description prequalification request comprising an application description describing an application stored at a developer device, the application description identifies one or more symbols used by the application, and where the application description is distinct from the application;
    determine, by the distribution device, that the application description is not in compliance with one or more application development policies, wherein the application development policies comprise general policy data and specific policy data, the general policy data applicable for all application descriptions and the specific policy data applicable to the received application description, and where compliance is determined based on comparing the one or more symbols identified in the application description and the general policy data and the specific policy data of the application development policies;

generate, by the distribution device, at least one error when the application description is not in compliance with at least one the general policy data and the specific policy data of the application development policies; and in response to generating the error, preventing, by the distribution device, the application from being uploaded from the developer device to the distribution device for review, approval, and distribution.

12. The non-transitory computer-readable medium of claim 11, wherein the instructions cause the one or more processors to:

determine, by the distribution device, that the application description is in compliance with one or more application development policies; and allow the application to be uploaded from the developer device for review, approval, and distribution when the application description is in compliance with the application development policies.

13. The non-transitory computer-readable medium of claim 11, wherein instructions cause the one or more processors to:

generate warnings when the application description describes deprecated symbols.

14. The non-transitory computer-readable medium of claim 11, wherein the specific policy data identify developer-licensed application programming interfaces, and the instructions cause the one or more processors to:

compare one or more application programming interface to the developer-licensed application programming interfaces in the application development policies;

downgrade the error when the one or more application programming interface matches a developer-licensed application programming interface; and in response to downgrade of the error, enable, by the distribution device, the application to be uploaded from the developer device to the distribution device for review, approval, and distribution.

15. A non-transitory computer-readable medium including one or more sequences of instructions which, when executed by one or more processors, causes the one or more processors to:

generate, by a developer device, an application description describing at least a portion of an application;

transmit, by the developer device, an application description prequalification request including the application description to a distribution device, the application description identifies one or more symbols used by the application, and where the application description is distinct from the application;

receive a message from the distribution device indicating that the application description violates one or more application development policies, wherein the application development policies comprises general policy data and specific policy data, the general policy data applicable for all application descriptions and the specific policy data applicable to the received application description, and where violations are determined based on a comparison of the one or more symbols identified in the application description and the general policy data and specific policy data of the application development policies; and prevent, by the developer device, the application from being uploaded to the distribution device for review, approval, and distribution when the message indicates that the application violates at least one of the general policy data and the specific policy data of the application development policies.

16. The non-transitory computer-readable of claim 15, wherein the application description is transmitted to the distribution device over a synchronous connection.

17. The non-transitory computer-readable of claim 15, wherein the instructions cause the one or more processors to:

receive a message from the distribution device indicating that the application description describes an application that complies with application development policies configured at the distribution device;

upload, by the developer device, the application to the distribution device for review, approval, and distribution when the message indicates that the application complies with the application development policies.

18. The non-transitory computer-readable of claim 15, wherein the application description includes binary files that include symbols associated with the application and the application development policies identify prohibited symbols.

19. The non-transitory computer-readable of claim 15, wherein the application description includes configuration data for the application and the application development policies identify prohibited configuration data.

20. The non-transitory computer-readable of claim 15, wherein the application description includes resources associated with the application and the application development policies identify prohibited resources.

21. The method of claim 1, wherein the one or more symbols identify one or more application programming interfaces, configurations, or libraries.

22. A distribution device comprising:

one or more processors; and a non-transitory computer-readable medium including one or more instructions which, when executed by the one or more processors, causes the one or more processors to:

receive an application description prequalification request comprising an application description describing an application stored at a developer device, the application description identifies one or more symbols used by the application, and where the application description is distinct from the application;

determine that the application description is not in compliance with one or more application development policies, wherein the application development policies comprise general policy data and specific policy data, the general policy data applicable for all application descriptions and the specific policy data applicable to the received application description, and where compliance is determined based on comparing the one or more symbols identified in the application description and the general policy data and the specific policy data of the application development policies;

generate at least one error when the application description is not in compliance with at least one the general policy data and the specific policy data of the application development policies; and in response to generating the error, preventing the application from being uploaded from the developer device to the distribution device for review, approval, and distribution.

23. The distribution device of claim 22, wherein the instructions cause the one or more processors to:
   determine that the application description is in compliance with one or more application development policies; and
   allow the application to be uploaded from the developer device for review, approval, and distribution when the application description is in compliance with the application development policies.

24. The distribution device of claim 22, wherein instructions cause the one or more processors to:
   generate warnings when the application description describes deprecated symbols.

25. The distribution device of claim 22, wherein the specific policy data identify developer-licensed application programming interfaces, and the instructions cause the one or more processors to:
   compare one or more application programming interface to the developer-licensed application programming interfaces in the application development policies;
   downgrade the error when the one or more application programming interface matches a developer-licensed application programming interface; and
   in response to downgrade of the error, enable the application to be uploaded from the developer device to the distribution device for review, approval, and distribution.

26. The distribution device of claim 22, wherein the one or more symbols identify one or more application programming interfaces, configurations, or libraries.

27. A developer device comprising:
   one or more processors; and
   a non-transitory computer-readable medium including one or more instructions which, when executed by the one or more processors, causes the one or more processors to:
      generate an application description describing at least a portion of an application;
      transmit an application description prequalification request including the application description to a distribution device, the application description identifies one or more symbols used by the application, and where the application description is distinct from the application;
      receive a message from the distribution device indicating that the application description violates one or more application development policies, wherein the application development policies comprises general policy data and specific policy data, the general policy data applicable for all application descriptions and the specific policy data applicable to the received application description, and where violations are determined based on a comparison of the one or more symbols identified in the application description and the general policy data and specific policy data of the application development policies; and
      prevent the application from being uploaded to the distribution device for review, approval, and distribution when the message indicates that the application violates at least one of the general policy data and the specific policy data of the application development policies.

28. The developer device of claim 27, wherein the application description is transmitted to the distribution device over a synchronous connection.

29. The developer device of claim 27, wherein the instructions cause the one or more processors to:
   receive a message from the distribution device indicating that the application description describes an application that complies with application development policies configured at the distribution device;
   upload the application to the distribution device for review, approval, and distribution when the message indicates that the application complies with the application development policies.

30. The developer device of claim 27, wherein the application description includes binary files that include symbols associated with the application and the application development policies identify prohibited symbols.

31. The developer device of claim 27, wherein the application description includes configuration data for the application and the application development policies identify prohibited configuration data.

32. The developer device of claim 27, wherein the application description includes resources associated with the application and the application development policies identify prohibited resources.

33. The developer device of claim 27, wherein the one or more symbols identify one or more application programming interfaces, configurations, or libraries.

34. The method of claim 5, wherein the one or more symbols identify one or more application programming interfaces, configurations, or libraries.

* * * * *